United States Patent [19]
Buschbom et al.

[11] 3,902,592
[45] Sept. 2, 1975

[54] SWEEP ACTION BELT FEEDER

[75] Inventors: Floyd E. Buschbom, Long Lake;
Glen D. Hansen, Maple Plain;
Walter W. Wolfe, Mound, all of
Minn.

[73] Assignee: Veda, Inc., Long Lake, Minn.

[22] Filed: Jan. 28, 1974

[21] Appl. No.: 436,901

[52] U.S. Cl. ............... 198/188; 119/52 B; 198/204; 198/230
[51] Int. Cl.² .................... B65G 47/42; A01K 5/02
[58] Field of Search ............ 198/188, 185, 83, 204, 198/38, 129, 160, 57, 37; 119/52 B, 56 A, 56 R; 222/55

[56] References Cited
UNITED STATES PATENTS

| | | | |
|---|---|---|---|
| 2,066,206 | 12/1936 | Laurie | 198/184 |
| 2,457,407 | 12/1948 | Sebastian | 198/184 |
| 2,641,355 | 6/1953 | Hudson | 198/188 |
| 3,191,747 | 6/1965 | Pollard | 198/185 |
| 3,679,042 | 7/1972 | Smoker et al. | 198/185 |
| 3,759,227 | 9/1973 | Wolfe et al. | 198/188 |

*Primary Examiner*—Richard A. Schacher
*Assistant Examiner*—Jeffrey V. Nase

[57] ABSTRACT

A belt feeder having moving endless belt carrying an elongated row of feed over a feed bunk. The belt is supported on a pan carrying transverse strips elevating parts of the belt from the support. A laterally movable sweep moves the feed from the belt into the feed bunk. Feed sensing arms biased into engagement with the sweep are engaged by feed on the belt to actuate a motor operable to move the sweep to push the feed from the belt. A diverter sweep section is pivotally attached to the front end of the sweep to keep feed on one side of the sweep. A control unit connected to the diverter sweep section is operable to selectively locate the diverter sweep section adjacent either side of the belt according to the park postion of the sweep.

7 Claims, 16 Drawing Figures

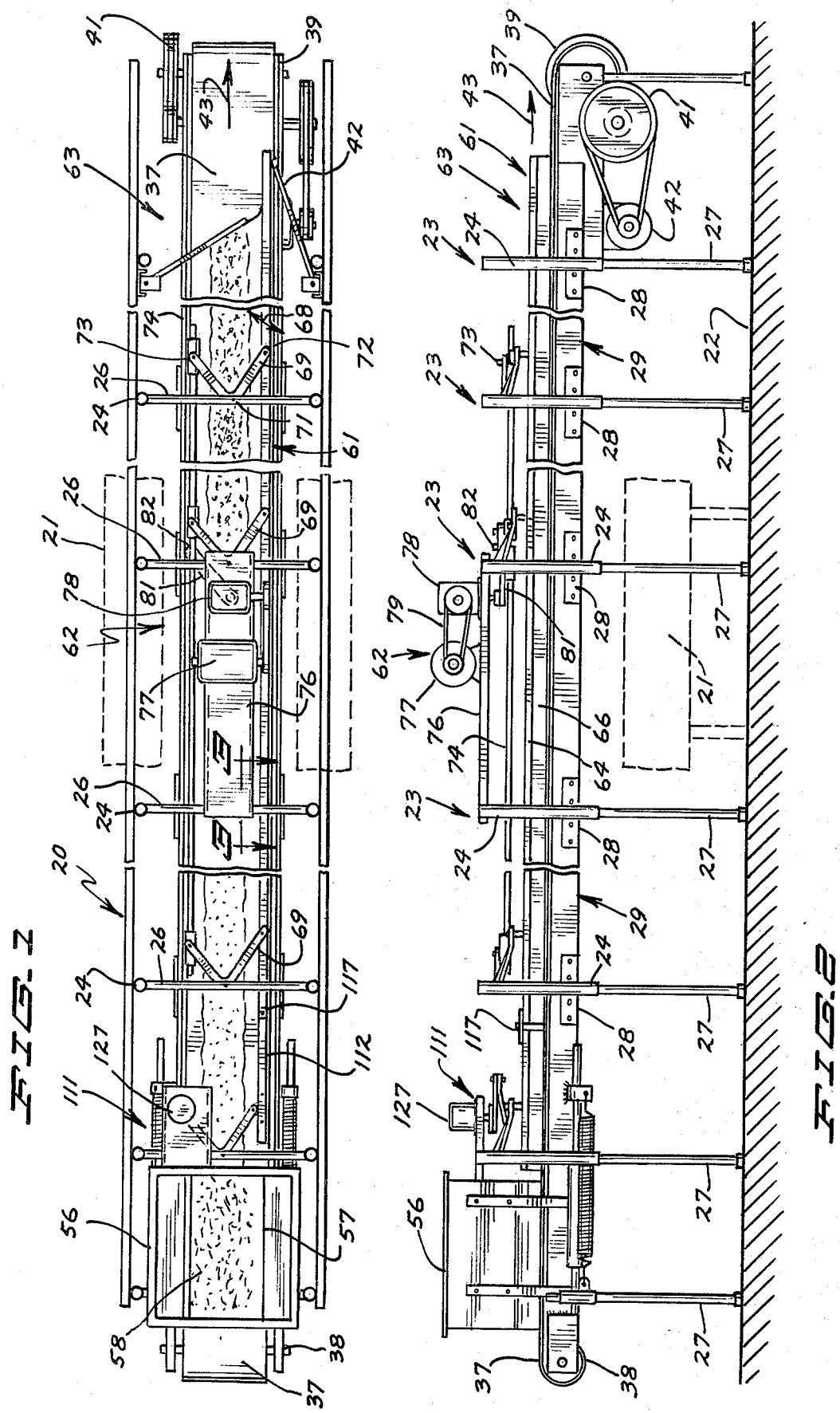

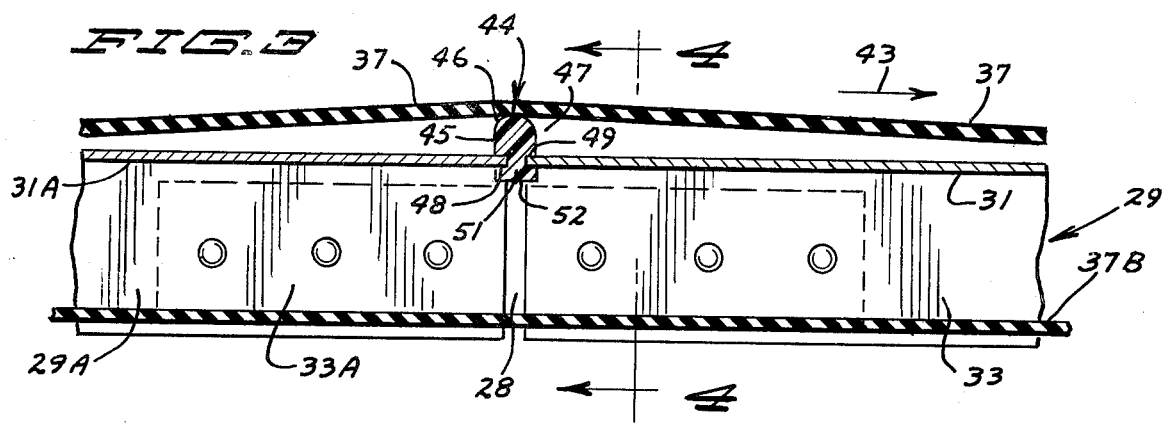
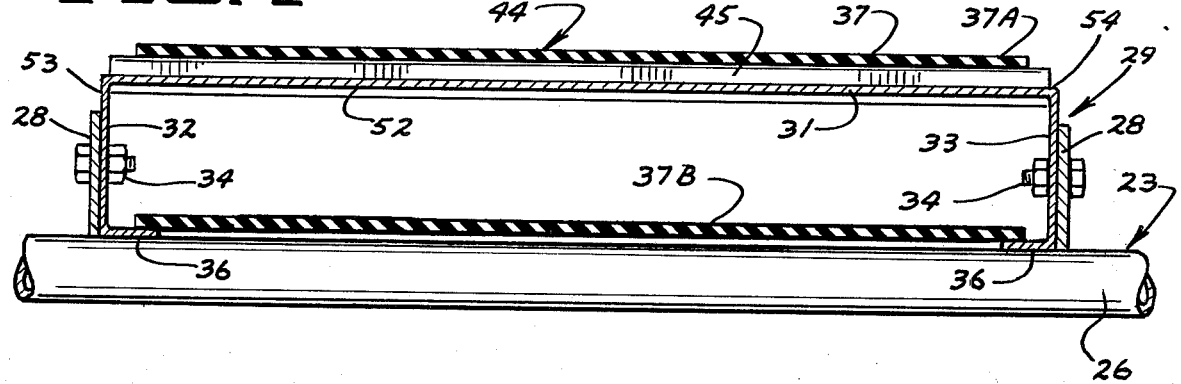
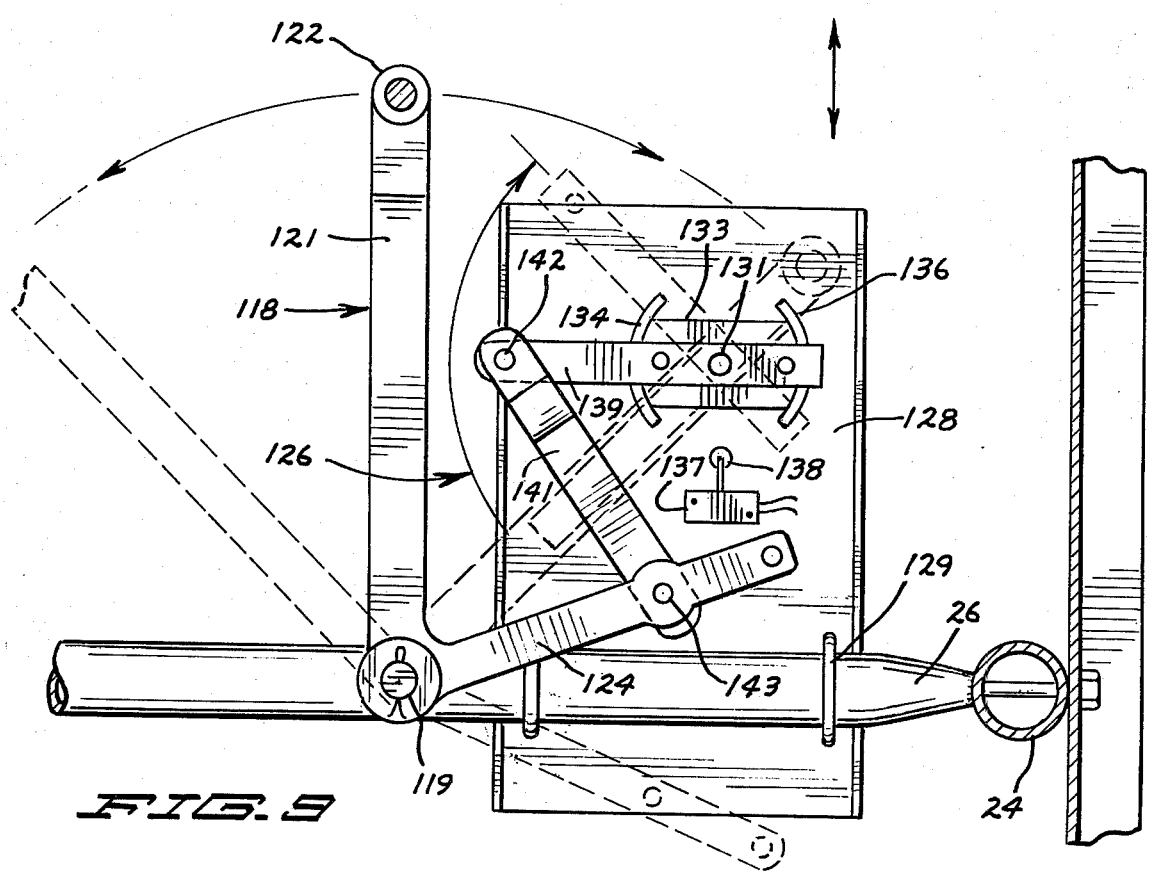

SWEEP ACTION BELT FEEDER

BACKGROUND OF INVENTION

1. Field of Invention

The present invention relates to material dispensing apparatus. More particularly, the invention is directed to a belt-type feeder for dispensing an elongated ribbon of feed into a livestock feeding bunk.

2. Prior Art

Feeders having movable endless belts and means to remove feed from the belts are known. A belt-type feeder having a transversely movable sweep member to push the material from the belt into a feed bunk is shown in U.S. Pat. No. 3,759,227. The belt rides on an elongated metal pan. In use, the belt will stick to the pan when it is wet or damp. The moisture creates a suction force which must be overcome to move the belt relative to the pan. In cold weather the belt will freeze to the pan, making the feeder inoperative.

This feeder has a downwardly directed actuator paddle which operates a switch in response to the material on the belt. The material is placed in a relatively narrow windrow on the belt so that it will be aligned with the paddle. In the event that the material is not positioned on the belt in alignment with the paddle, the paddle will not be actuated and the sweep mechanism will not operate to remove the material from the belt.

The sweep mechanism of the feeder is mounted on angularly movable arms so that the sweep has an arcuate movement toward and away from the hopper. On the return movement of the sweep, the material carried forward by the belt is pushed off the opposite side of the belt, thereby creating a pile of material adjacent the hopper. The sweep must be alternately parked on opposite sides of the belt to prevent buildup of material on one side of the belt. The present invention overcomes the disadvantages of this belt-type feeder.

SUMMARY OF INVENTION

The invention is directed to a material dispensing apparatus having a moving conveyor operable to carry material in an elongated path. A sweep means is movable relative to the conveyor to remove the material in a general lateral direction from the conveyor to a material receiving location. A motor is operable to move the sweep means. The conveyor is an elongated endless belt which rides on a pan. A plurality of longitudinally spaced, transverse strip means are mounted on the pan under the belt to minimize surface tension and prevent freezing of the bThe strip means provides the feeder with a relatively low starting torque, permitting the use of a longer feeding belt.

A feed responsive control mechanism is operable to actuate the motor for moving the sweep means. The control mechanism includes a pair of sensing means located over the belt and projected toward the sweep means so that location of feed on the blet is not critical to its operation. The sensing means are pivoted about generally upright axes so that they are sensitive to feed located on all areas of the belt. The sensing means are connected together with a biasing means so that a substantially equal biasing load is applied to the sensing means. The material on the belt is not required to be in any particular location or on a windrow to actuate the sensing means. The control mechanism is flexible in use as several feed lot arrangements, as one, two, three or more, can be serviced with the use of control switches.

A control means cooperates with the sweep means to hold the material on the forward end of the conveyor during operation of the sweep means, to thereby prevent buildup of material on the non-feeding side of the conveyor during return movement of the sweep means. The control means has a member connected to the sweep means and means operable to change the location of the forward end of the member relative to opposite sides of the hopper so that the control means is selectively usable with the operation of the sweep means from either side of the belt.

An object of the invention is to provide a belt feeder with means associated with the belt to minimize freezing of the belt to its support and reduce the coefficient of friction between the belt and the support, thereby providing the belt with low starting torque. A further object of the invention is to provide a material dispensing apparatus with a material responsive control means that is sensitive to feed located in all areas of a moving conveyor and that can be selectively used to deposit material on opposite or both sides of the conveyor and into several feed lot arrangements. A still further object of the invention is to provide a feeder with a sweep to remove material from a conveyor with a control operable to hold the material on the forward end of the conveyor during operation of the sweep. Yet another object of the invention is to provide a control for the forward end of a laterally movable sweep that is usable with selective opposite movements of the sweep.

BRIEF DESCRIPTION OF THE DRAWINGS

FIG. 1 is a fragmentary top plan view of a belt feeder of the invention;

FIG. 2 is a fragmentary side elevational view of FIG. 1;

FIG. 3 is an enlarged sectional view taken along the line 3—3 of FIG. 1;

FIG. 4 is a sectional view taken along the line 4—4 of FIG. 3;

FIG. 9 is an enlarged sectional view taken along the line 9—9 of FIG. 8;

DESCRIPTION OF PREFERRED EMBODIMENT

Figure 5:
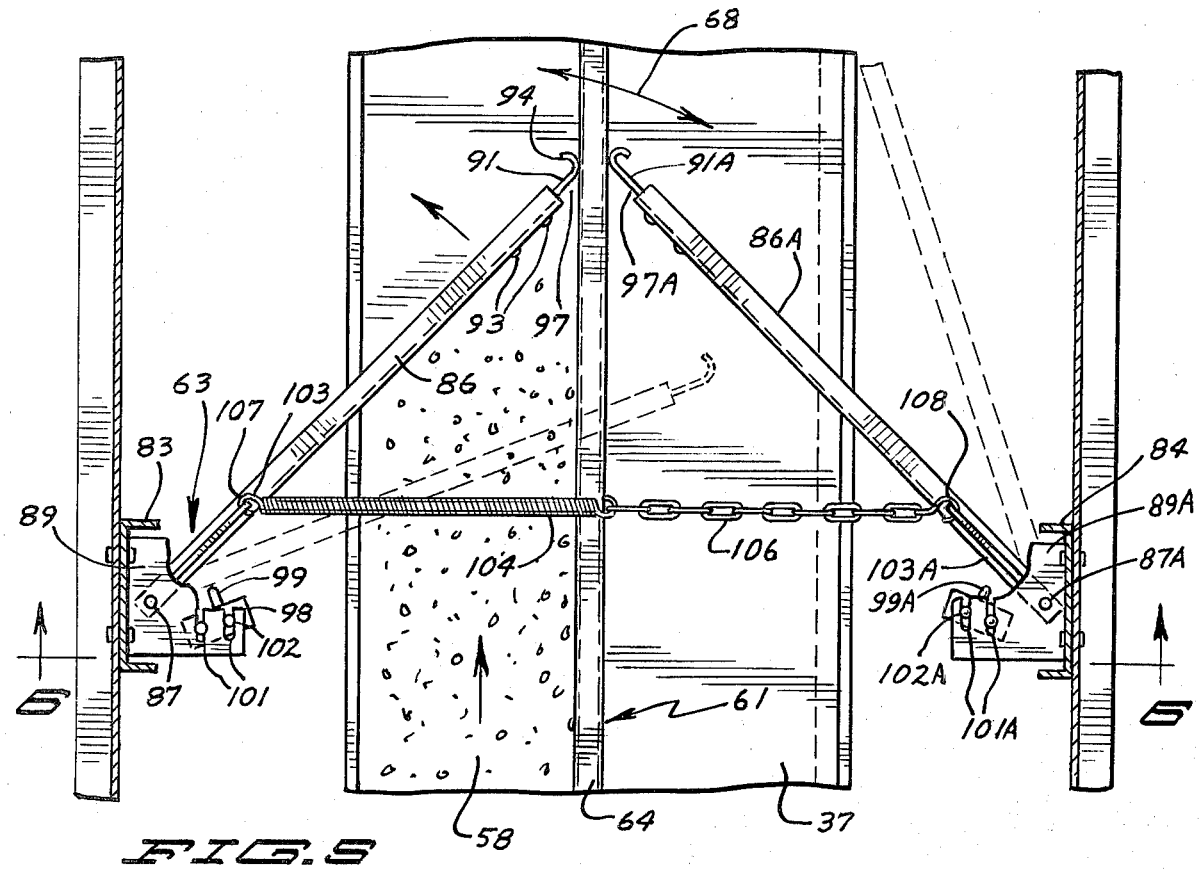
FIG. 5 is an enlarged top plan view of the actuator control of the feeder of FIG. 1.

Referring to FIGS. 1 and 2, there is shown a material handling apparatus indicated generally at 20 for conveying and discharging a linear ribbon or row of particulate material to a desired location, as elongated feed bunk 21. The material handling apparatus 20 and feed bunk 21 are supported on a generally horizontal surface 22, such as the ground or a feed lot surface. Material handling apparatus 20 is hereinafter defined as a livestock feeder operable to discharge livestock feeds in an elongated ribbon or row into a feed bunk. The material handling apparatus 20 can be used in other material handling systems to discharge particulate or bulk materials into a desired location.

Apparatus 20 has a plurality of longitudinally spaced frame assemblies indicated generally at 23 for supporting the apparatus on the surface 22 at a selected height. Frame assemblies 23 are identical in structure and comprise a pair of upright side members 24 connected together with a pair of horizontal members 26. Downwardly directed legs 27 are mounted on the upright side member 24. The legs 27 are adjustable in length relative to side members 24 so that the frame assemblies can be adjusted to accommodate the contour of the surface 22 and thereby level apparatus 20. Legs 27 can extend upwardly to suspend the frame assemblies from overhead structures. The frame assemblies 23 have generally horizontal plates 28 secured, by means of welds, to inside portions of the side members 24.

An elongated generally horizontal pan indicated generally at 29 is attached to plates 28 with a plurality of nut and bolt assemblies 34, as shown in FIG. 4. Referring to FIGS. 3 and 4, pan 29 has an elongated generally horizontal top wall 31. Downwardly directed side flanges 32 and 33 are joined to the side side edges of wall 31 and terminate in inwardly directed ribs 36 which rest on the horizontal member 26. Pan 29 is fabricated from sheet metal in sections of standard length, for example, 10 feet. As shown in FIG. 3, adjacent sections are aligned in end-to-end relationship with the top walls 31 and 31A located in generally the same horizontal plane. The adjacent pan section 29A is identified with the same reference numerals having the suffix A.

Returning to FIGS. 1 and 2, pan 29 supports an endless belt 37. Belt 37 is trained about an idler roller 38 rotatably mounted on the forward end of the first frame assembly and a drive roller 39 rotatably mounted on the last frame assembly. A belt and pulley power transmission 41 is connected to drive roller 39 and driven with an electric motor 42. On operation of electric motor 42, the endless belt 37 moves in an elongated direction, as shown by arrow 43. As shown in FIGS. 3 and 4, the upper run 37A of the belt rides on the top wall 31 of the pan. The lower run 37B is located under the top wall 31 and rides on the ribs 36.

Transverse spacers indicated generally at 44 are located between adjacent pan sections, as shown in FIGS. 3 and 4. The transverse spacers 44 are elongated plastic members which function as scrapers for the bottom side of the top run 37A of the belt and hold the top rung spaced from the top walls 31 and 31A. Transverse spacers 44 provide spaces at intervals along the pan 29 below the belt which minimizes freezing and adhesion of the belt to the top wall 31 of the pan 29 and remove foreign material from the bottom of the top run of the belt.

The transverse spacers 44 are elongated plastic members made of Nylon or like material. Each spacer comprises an elongated bead 45 projected above the plane of the top wall 31. Bead 45 has a round outer surface 46 adapted to be engaged by the bottom surface of the top run 37A of the belt. The spacer 44 has a pair of side or lateral grooves 48 and 49 along opposite sides thereof accommodating adjacent transverse edges of the top walls 31 and 31A. The grooves 48 and 49 are spaced from each other with a neck 51 joined to an enlarged transverse base 52. As shown in FIG. 4, the ends 53 and 54 of the base 52 engage side flanges 32 and 33, respectively, to thereby hold the spacer 44 in fixed assembled relation with the pan 29.

Returning to FIGS. 1 and 2, hopper 56 is located over the forward portion of the belt 37. Hopper 56 has an open top and open bottom 57 whereby material 58, as feed, can be placed into the hopper 56. The belt carries the feed from the hopper in an elongated ribbon or row along the length of the feeder. The material 58 is a continuous ribbon so long as there is a supply of material in the hopper 56.

The ribbon of material on the top of belt 37 is pushed off one side of the belt simultaneously into the bunk 21. An elongated longitudinal sweep indicated generally at 61 is movable in a generally lateral direction to push or sweep the ribbon of material 58 into the bunk. A drive assembly indicated generally at 62 is operable to sequentially move the sweep 61. A switch mechanism indicated generally at 63 located adjacent the terminal end of the feeder is operable in response to feed on the belt to actuate the drive assembly and thereby move the sweep 61 to dispense the ribbon of material into the bunk 21.

Figure 6:
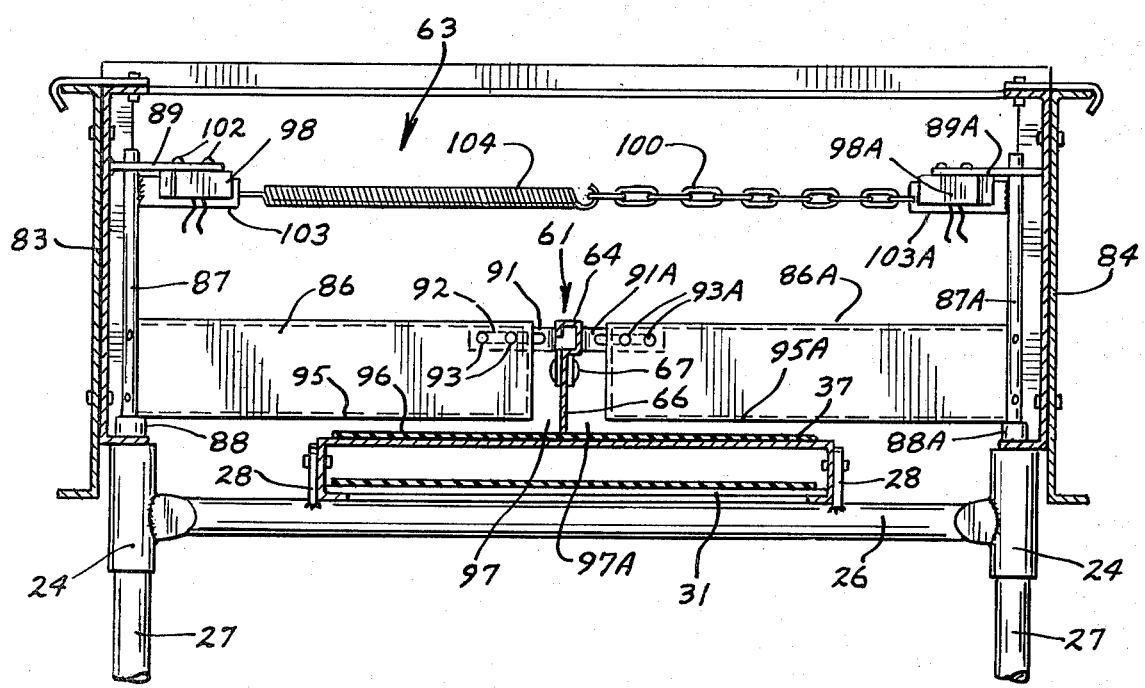
FIG. 6 is a sectional view taken along the line 6—6 of FIG. 5.

Sweep 61, shown in FIG. 6, comprises an elongated support or bar 64. A generally flat flexible sheet member 66 is attached to a lower portion of bar 64 with fasteners 67, such as bolts or rivets. The flexible sheet member 66 can be rubber, canvas or plastic material which has an elongated linear bottom edge positioned in contiguous relationship with the top surface of belt 37. Sweep 61 moves in an arcuate path, as indicated by arrow 68 in FIGS. 1 and 5, as it moves across the belt 37. The sweep 61 is supported on a plurality of crank arms 69. The apex or midportions of the crank arms 69 are pivotally connected to center sections of the horizontal frame members 26 with generally upright pivots 71. The outer end of one arm of the crank arm 69 is connected with an upright pivot 72 to the bar 64. The outer end of the other arm of the crank arm 69 is attached to a connector 73 carrying an elongated longitudinal push rod 74. Push rod 74 is connected to all of the crank arms 69 through connectors 73. Connectors 73 have upright pivots which allow the crank arm to arcuately move to swing the sweep 61 over the top run of belt 37.

Drive assembly 62 is operable to move the push rod 74. Drive assembly 62 is mounted on a generally horizontal support 76 carried by the frame members 23. A motor 77, as an electric motor, mounted on the support 76 is drivably connected to a gear box 78 with a belt and pulley drive 79. The gear box 79 has an arm 81 located below support 76. Arm 81 angularly moves about an upright axis and is pivotally connected with a pivot 82 to the push rod 74. Operation of gear box 78 will angularly move the arm 81, to thereby angularly move the crank arms 69. This swings the sweep 61 relative to belt 37, discharging the feed into the feed bunk 21.

Referring to FIGS. 5 and 6, the switch mechanism 63 comprises a pair of upright side members 83 and 84 attached to the frame of the feeder. A generally horizontal plate or sensor member 86 projects inwardly from the side member 83 toward the sweep 61. Plate 86 is secured by welds or the like to an upright rod 87. The lower end of rod 87 is rotatably mounted in a sleeve 88 secured to the lower flange of side member 83. The upper end of rod 87 extends through a suitable hole in a horizontal bracket 89 secured to the side member 83. The rod 87 is rotatable about a generally upright axis, whereby the plate 86 can swing in a horizontal plane. A horizontal arm 91 extends from the outer end of plate 86. Arm 91 has a longitudinal slot 92 accommodating fasteners 93, as nut and bolt assemblies, to adjustably mount the arm of the end of plate 86. Arm 91 has a rearwardly turned or curved end 94 located in sliding engagement with the side of sweep 61. Arm 91 is adjustable in length establishing a space 97 between the end of plate 86 and sweep 61. The plate 86 has a lower edge 95 that is spaced a short distance or space 96 above the top run of belt 37. Plate 86 is located at a rearward or downstream angle across the belt so that feed on the belt, regardless of its transverse location on the belt, will pivot the plate 86 to actuate a switch 98.

Secured to the bracket 89 is a microswitch 98 having a movable actuator 99. Bracket 89 has a plurality of elongated slots 101 accommodating bolts 102 to adjustably mount the switch 98 on the bracket 89. An arm 103 is secured to the rod 87 and extends outwardly adjacent switch 98. Arm 103 is adapted to engage actuator 99 on pivotal movement of plate 86 in a forward direction. Switch 98 can be mounted adjacent the opposite sides of arm 103 so that arm 103 will engage actuator 99 on pivotal movement in a rearward direction as indicated by the arrow in FIG. 5.

Switch mechanism 63 has a second actuator or sensor plate 86A located on the opposite side of sweep 61. The plate 86A is similar in construction to the mechanism of the opposite side of the plate. Identical parts are identified with the same reference numeral having the suffix A. Arms 103 and 103A are connected with a spring 104 and chain 106. The spring 104 has a hook 107 connected to the outer end of arm 103. The chain 106 is connected to the opposite end of the spring 104 and has a hook 108 connected to the outer end of arm 103A. The spring 104 biases sensing plates 86 and 86A toward each other with the same force and into engagement with opposite sides of the sweep 61. The spring 104 connecting the sensing plates 86 and 86A applies equal force to and coordinates the actuation of switches 98 and 98A to control the operation of the sweep drive motor 77. By acting on both plates 86 and 86A, spring 104 provides the plates with substantially the same operational sensitivity whereby the switch mechanism 63 operates the same with feed on either side of sweep 61.

Figure 7:
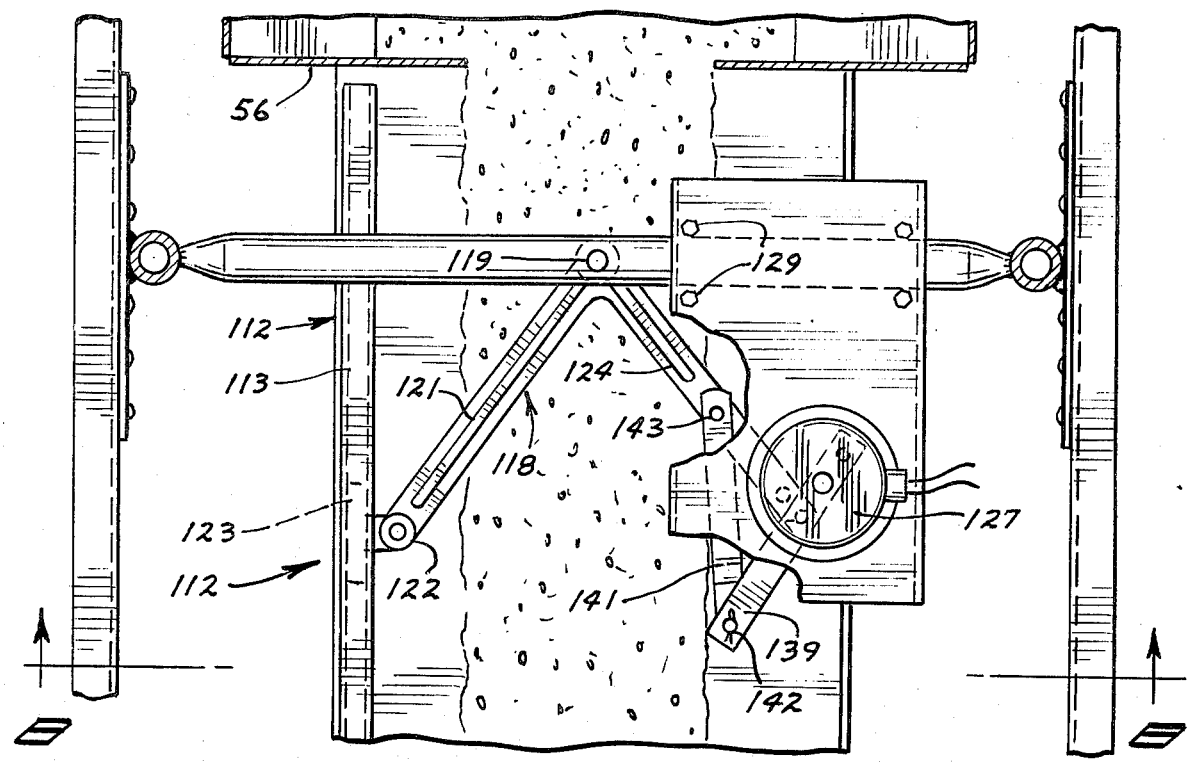
FIG. 7 is a top plan view, partly sectioned, of the control for the sweep end positioner adjacent the forward end of the sweep.
Figure 8:
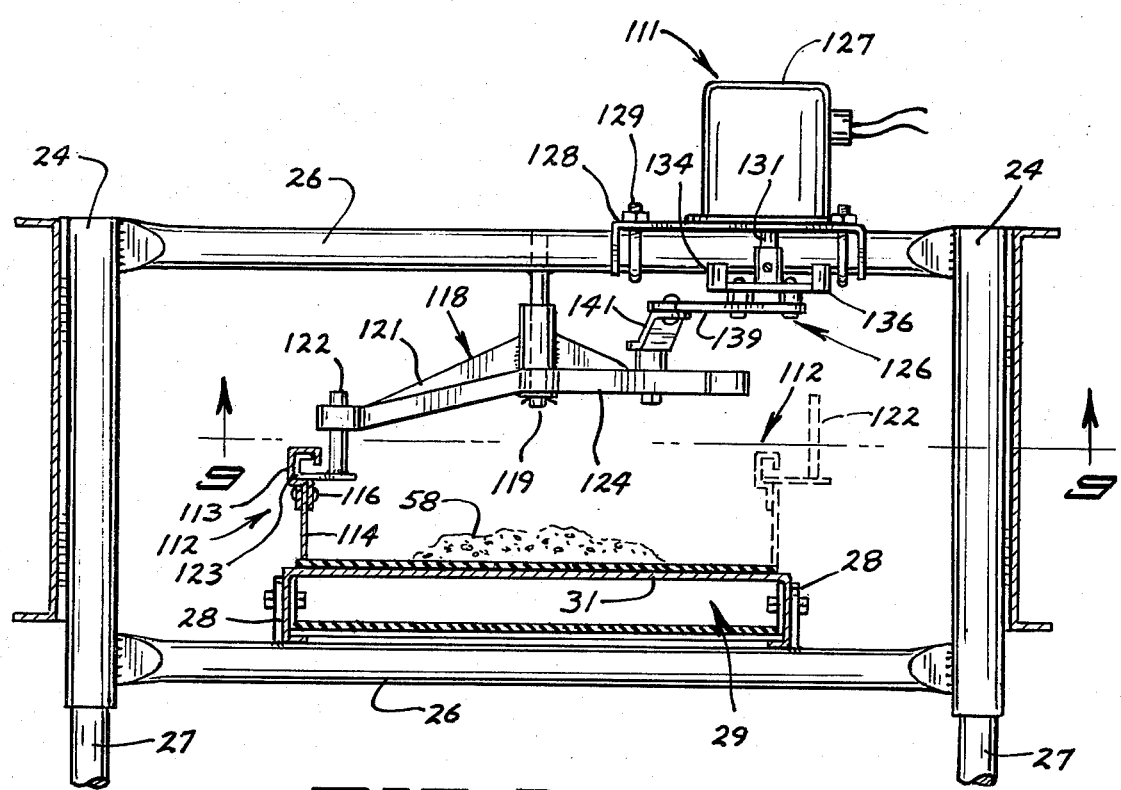
FIG. 8 is a sectional view taken along the line 8—8 of FIG. 7.

Throwback or pileup of feed on the opposite side of the feeding location is prevented with an automatic feed control unit, or sweep end positioner, indicated generally at 111. As shown in FIGS. 1 and 2, the feed control unit 111 comprises a diverter 112 in the form of a pivotally mounted sweep section which prevents feed from moving onto the belt behind sweep 61 as the sweep 61 moves to discharge the ribbon of feed from the side of belt 37. As shown in FIGS. 7 and 8, diverter 112 comprises an elongated support or bar 113. Downwardly extended flexible sheet member 114 is attached to the bar 113 with a plurality of fasteners 116, as rivets, bolts or the like. The downstream or rear end of diverter 112 is pivotally connected with an upright pivot 117, shown in FIGS. 1 and 2, to the front end of sweep 61. This end of diverter 112 will move with sweep 61.

The front or forward end of diverter 112 is connected to a crank indicated generally at 118. The midsection or apex of crank 118 is mounted on a downwardly extended pivot 119. Pivot 119 is attached to the midsection of the cross frame member 26. Crank 118 has a first arm 121 carrying at its outer end a generally upright pin 122. As shown in FIG. 8, pin 122 is connected a generally U-shaped slide 123. Slide 123 is located in the channel of the bar 113 whereby the bar 113 can reciprocate relative to the pin 122 as the diverter 112 pivots about the upright axis of pin 122. Crank 118 has a second arm 124 connected to a power transmitting linkage indicated generally at 126. A motor 127, as an electric motor, drives the linkage 126 to angularly move the crank 118 to change the position of the pin 122 to either the right side of the belt, as shown in broken lines, or the left side of the belt, shown in full lines, depending on the direction of feeding of the sweep 61. Motor 127 is carried by a generally horizontal support 128 attached to frame 26 with fasteners 129, as U-bolts.

Power transmitting linkage 126 is connected to the output shaft 131 of the motor and comprises a plate or trip member 133 carrying diammetrically opposed cams 134 and 136. Cams 134 and 136 sequentially move into operative engagement with a microswitch 137. The microswitch 137 has a movable actuator 138 which is sequentially engaged by cams 134 and 136, respectively, to terminate the power to the motor 127. As shown in FIG. 9, an arm 139 is attached to trip member 133. The outer end of the arm 139 is pivotally connected to a link 141 with a pivot 142. The opposite end of link 141 is pivotally connected with pivot 143 to the second arm 124 so that rotation of arm 139 about the axis of the output shaft 131 will oscillate the crank 118 to change the position of the pin 122 to either the right or left side of the belt.

Figure 16:
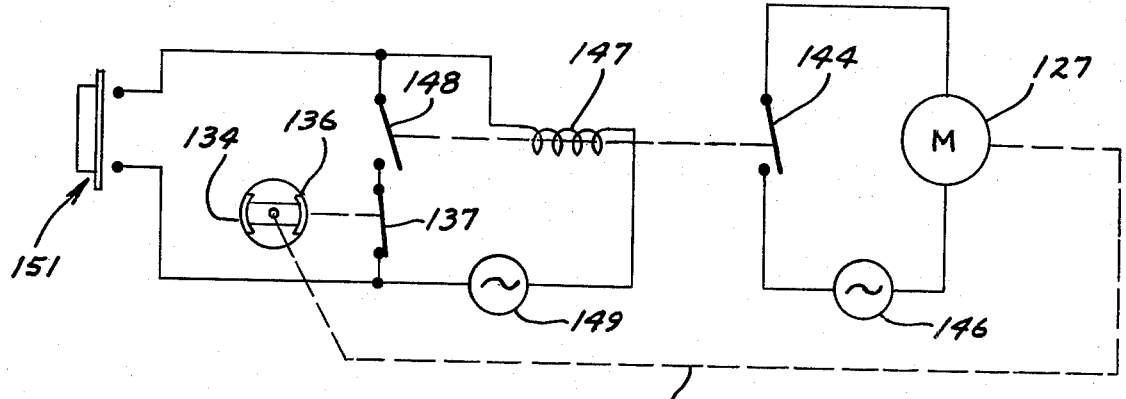
FIG. 16 is an electromechanical diagrammatic view of the control system for the sweep end positioner.

Referring to FIG. 16, the electromechanical diagrammatic view of the control system for the diverter 112 includes a main control switch 144 operable to connect the power source 146 to the motor 127. Switch 144 is controlled with a solenoid relay 147. Relay 147 also controls a switch 148. Switch 148 is in series with microswitch 137 and a low voltage power source 149. A manually operated switch 151 is operable to close the circuit for the solenoid 147 and thereby close the switch 144 to energize the motor 127. Motor 127 will turn the cams 134 and 136 to thereby permit microswitch 137 to close. This will connect the solenoid 147 with the power source 149, thereby continuing the operation of motor 127. Motor 127 will continue to run until one of the cams opens the microswitch 137. Motor 127 will run until the output shaft 131 rotates 360°. This motion is sufficient to change the position of the pivot pin 122 from one side to the opposite side of the belt, as shown in full and broken lines in FIG. 8.

Figure 10:
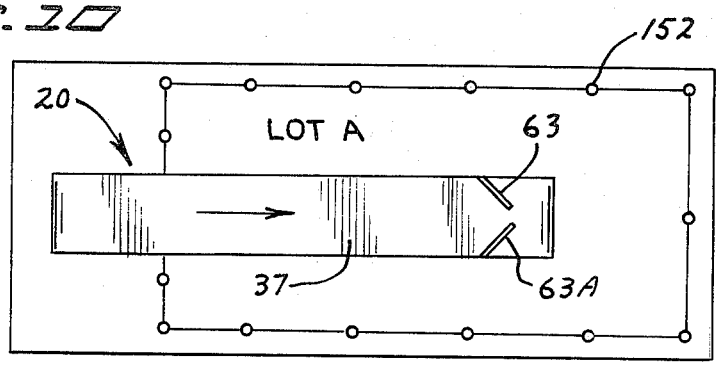
FIG. 10 is a diagrammatic layout of the feeder of the invention in a feed lot.
Figure 11:
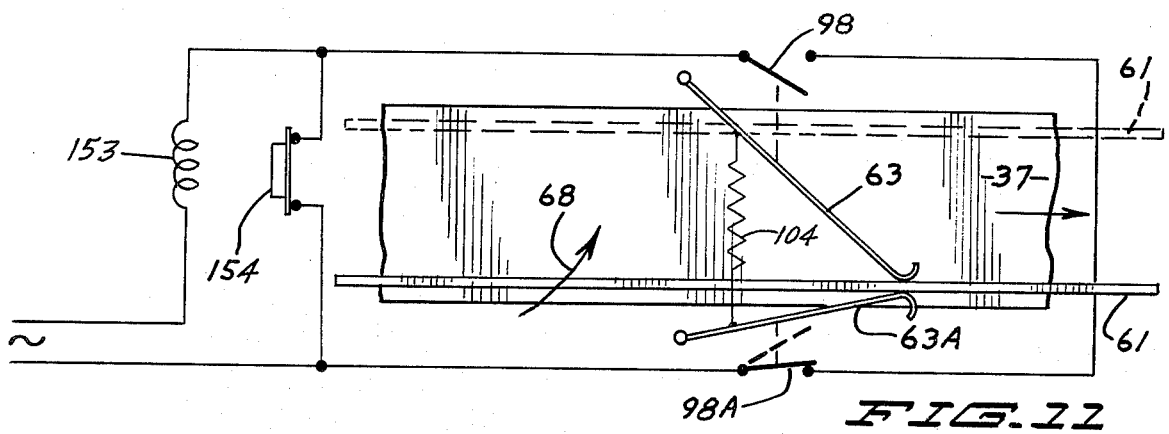
FIG. 11 is an electromechanical view of the control for the feeder of FIG. 10.

Referring to FIGS. 10 and 11, there is shown apparatus 20 operable to sequentially discharge an elongated ribbon of feed to opposite sides of the belt 37 so that cattle can feed from both sides of the bunk in a feed lot A. The lot A is defined by a fence 152. Referring to FIG. 11, the electromechanical circuit diagram includes a magnetic relay 153 in the power line for energizing the motor 77. Magnetic relay 153 can be manually operated with switch 154 to energize the motor and thereby operate the sweep 61 to move material off the belt 37. The sweep 61 is located on one side of the belt 37 so that the material moving with the belt will engage the sensor plate 63. As the pressure of the material against the sensor plate 63 builds up, the plate will eventually move to close the microswitch 98. This closes the circuit for the relay 153 energizing motor 77. Motor 77 operates to drive the sweep 61 in the direction of arrow 68 to push the material off the side of belt 37. The sensor plate 63, being biased by spring 104, moves along with the sweep 61 and out of engagement with the microswitch 98A. When the sweep 61 approaches the side of the belt opposite the microswitch 98A, the actuator of the microswitch opens, thereby opening the circuit to the relay 153 for motor 77. The sweep 61 will now be positioned adjacent the opposite side of the belt, as shown in broken lines. In the event it is desired to have sweep 61 returned to its initial position, as shown in full lines in FIG. 11, the switch 98A is bypassed, or remains closed, so that only switch 98 is operable to control the operation of motor 77.

Figure 12:
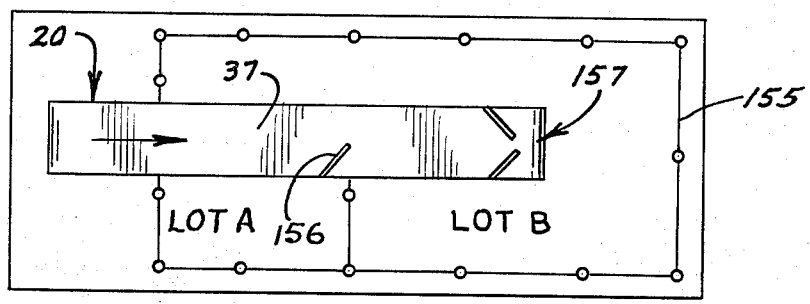
FIG. 12 is a diagrammatic view of the feeder of the invention in a two feed lot arrangement.
Figure 13:
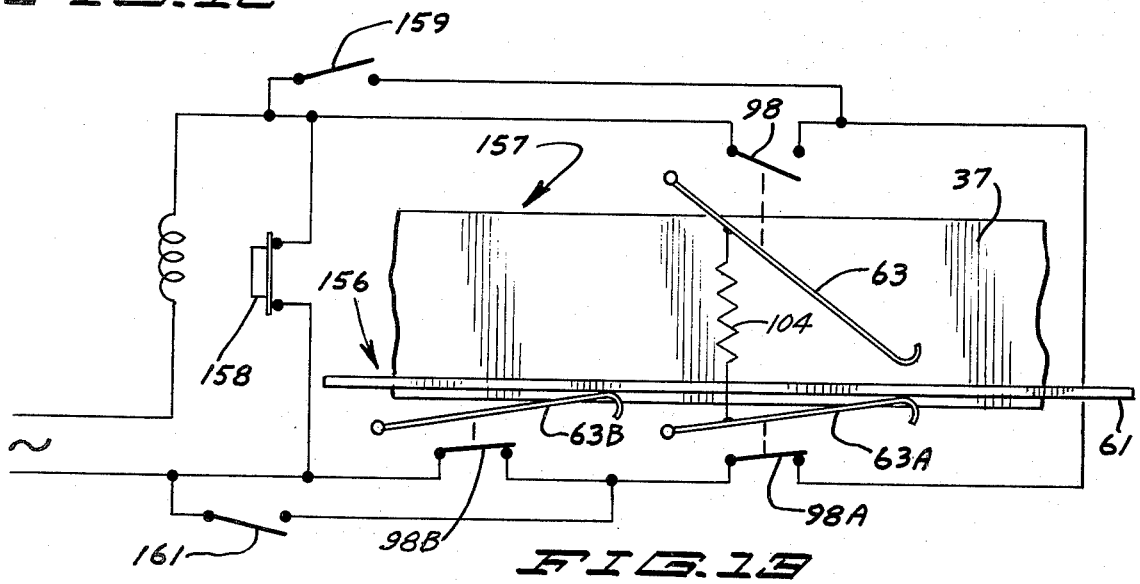
FIG. 13 is an electromechanical diagrammatic view of the control for the feeder of FIG. 12.

Referring to FIGS. 12 and 13, there is shown the feeder 20 in a two feed lot arrangement, shown as lot A and lot B. The lots are defined by a fence 155. The feeder 20 has a first switch mechanism indicated generally at 156 located intermediate the length of the feeder adjacent the end of lot A and a second switch mechanism indicated generally at 157 at the end of lot B. Each switch mechanism has sensing plates which control microswitches.

Referring to FIG. 13, the circuit has a first manually operated switch 159 located in parallel with microswitch 98 which can be closed to bypass the microswitch 98. A similar manually operated switch 161 is located in parallel with microswitch 98B and is operable to bypass the microswitch 98B. When switch 159 is closed, the sensing plate 63A is inoperative to energize the motor 77 to drive the sweep 61. The feed on belt 37 will move by the sensor plate 63B until it reaches the switch mechanism 157. All of the feed on the belt is then moved with the sweep 61 off the left side of the belt and is available to the cattle in feed lot B. With switches 159 and 161 open, the switch mechanism 156 is operable to dump feed into lot A.

Figure 14:
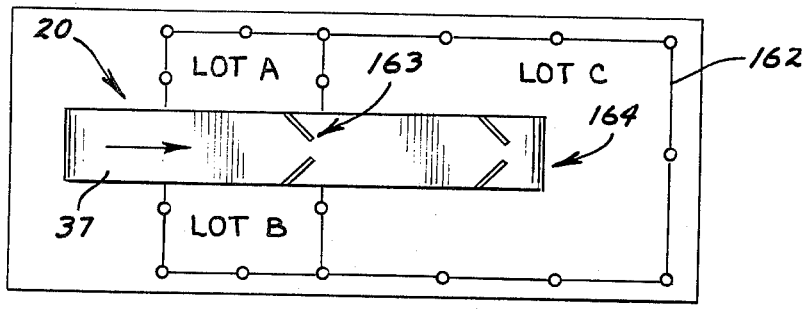
FIG. 14 is a diagrammatic view of the feeder of the invention in a three feed lot arrangement.
Figure 15:
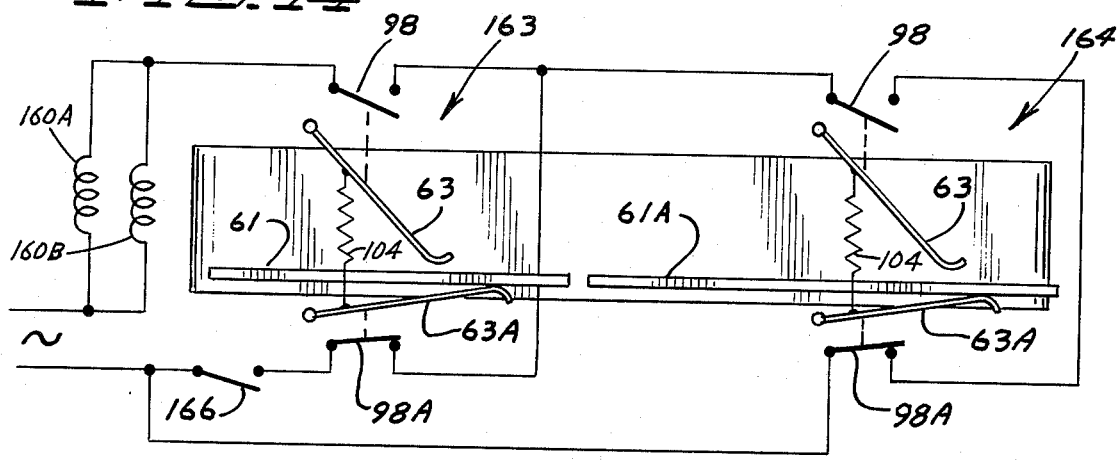
FIG. 15 is an electromechanical diagrammatic view of the control for the feeder of FIG. 14.

Referring to FIGS. 14 and 15, there is shown the feeding apparatus 20 in a three feed lot arrangement. The feeder 20 extends longitudinally through lot A and lot B into lot C. The lots are defined by fence 162. The feeder has two switch mechanisms 163 and 164. Each switch mechanism actuates a relay 160A or 160B for a separate motor similar to motor 77 for driving separate sections of sweep 61 and 61A. Switch mechanisms 163 and 164 are identical in construction and follow the switch mechanism shown in FIGS. 5 and 6. Each switch mechanism has a pair of sensing plates 63 and 63A engageable with opposite sides of the sweeps 61 and 61A, respectively. A manually operated switch 166 is interposed in line with the microswitch 98A of the switch mechanism 163. When switch 166 is open, the feeder operates to dispense feed into lots A and C. Lot B does not receive feed.

While there have been shown and described preferred embodiments of the invention, it is understood that various changes additions and omissions in the structure and circuits may be made by those skilled in the art without departing from the scope of the invention.

The embodiments of the invention in which an exclusive property or privilege is claimed are defined as follows:

1. An apparatus for dispensing material to a location comprising: first means for moving material in an elongated path, said first means including a conveyor means for moving material from the forward end of the elongated path to the rear end of the elongated path, second means movable relative to the first means to remove material from the first means and discharge said material to the location, said second means including a sweep means extended longitudinally over the top of the conveyor means and movable to move material off the side of the conveyor means to the location, and control means operable to hold material on the forward end of the first means during the operation of the second means.

2. The apparatus of claim 1 wherein: said control means has a member connected to the second means and means operable to change the location of the forward end of the member relative to the first means.

3. The apparatus of claim 1 wherein: said control means includes a member having one end pivotally connected to the forward end of the sweep means for controlling the position of the other end of the member whereby the other end of the member can be selectively located adjacent opposite sides of the conveyor means.

4. The apparatus of claim 3 including: a hopper for directing material onto the conveyor means, said member having a forward end located adjacent the hopper.

5. The apparatus of claim 1 wherein: said control means includes a sweep member, means pivotally mounting the sweep member to the second means, a crank pivotally connected to the sweep member and drive means for selectively driving the crank to position the sweep adjacent opposite sides of the first means.

6. The apparatus of claim 5 wherein: said drive means includes a motor, said control means including switch means operable to de-energize said motor when said crank is in a first position relative to one side of the conveyor means or a second position relative to the opposite side of the conveyor means.

7. The apparatus of claim 1 wherein: said control means includes a sweep section movably connected to the forward portion of the sweep, and means movably connected to the sweep section to hold one end of the sweep section in a selected location relative to the first means.

* * * * *

UNITED STATES PATENT AND TRADEMARK OFFICE
CERTIFICATE OF CORRECTION

PATENT NO. : 3,902,592
DATED : September 2, 1975
INVENTOR(S) : Floyd E. Buschbom et al It is certified that error appears in the above-identified patent and that said Letters Patent are hereby corrected as shown below:

Column 5, line 18, "of" should be --on--.

Column 5, line 42, "of" should be --on--.

Signed and Sealed this twenty-seventh Day of January 1976

[SEAL]

Attest:

RUTH C. MASON
Attesting Officer

C. MARSHALL DANN
Commissioner of Patents and Trademarks